(12) United States Patent
Nguyen et al.

(10) Patent No.: US 7,983,199 B1
(45) Date of Patent: Jul. 19, 2011

(54) VOICE OVER INTERNET PROTOCOL PUSH-TO-TALK COMMUNICATION SYSTEM

(75) Inventors: Bich Nguyen, Los Altos, CA (US); Ramanathan Jagadeesan, San Jose, CA (US); Rakendu Devdhar, Santa Clara, CA (US); Andrew Chung, Fremont, CA (US); Dana Blair, Alpharetta, GA (US); Ilya Slain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 2810 days.

(21) Appl. No.: 10/236,426

(22) Filed: Sep. 6, 2002

(51) Int. Cl.
*H04L 12/16* (2006.01)

(52) U.S. Cl. ............... 370/260; 455/518; 455/412.2; 455/463

(58) Field of Classification Search .......... 370/260, 370/261, 262, 263, 273; 455/518, 412.2, 455/463

See application file for complete search history.

(56) References Cited

U.S. PATENT DOCUMENTS

| | | | |
|---|---|---|---|
| 5,434,797 A * | 7/1995 | Barris | 709/204 |
| 6,332,153 B1 * | 12/2001 | Cohen | 709/204 |
| 6,466,550 B1 * | 10/2002 | Foster et al. | 370/261 |
| 6,477,150 B1 * | 11/2002 | Maggenti et al. | 370/312 |
| 7,170,863 B1 * | 1/2007 | Denman et al. | 370/260 |
| 2002/0077136 A1 * | 6/2002 | Maggenti et al. | 455/518 |
| 2003/0153342 A1 * | 8/2003 | Crockett et al. | 455/519 |
| 2003/0235184 A1 * | 12/2003 | Dorenbosch et al. | 370/352 |
| 2004/0192364 A1 * | 9/2004 | Ranalli et al. | 455/517 |

* cited by examiner

*Primary Examiner* — Huy D Vu
*Assistant Examiner* — Dady Chery
(74) *Attorney, Agent, or Firm* — Marger Johnson & McCollom, P.C.

(57) ABSTRACT

A push-to-talk conference call is conducted over a packet switched network. Participants send a request and receive approval before being allowed to talk during the conference call. In one implementation, only one of the participants is enabled to transmit audio packets while other participants are only allowed to receive audio packets.

25 Claims, 5 Drawing Sheets

VOICE OVER INTERNET PROTOCOL PUSH-TO-TALK COMMUNICATION SYSTEM

BACKGROUND

Group communication systems, such as trunked radio or dispatch communication systems use a half-duplex Push-To-Talk (PTT) scheme. A user who wants to talk to the group, pushes a PTT button/switch to request the floor for the conference call. The user then starts talking upon getting the floor, while all other members of the group listen.

In wireless group communications, a single radio channel can be used for transmitting to all members of the conference call group in a cell. The listeners do not need an uplink channel when in a listen-only mode. This makes efficient use of radio channel resources, as well as power resources in the mobile terminals.

Calls conducted over an Internet Protocol (IP) network are typically full duplex where each endpoint is enabled for transmitting and receiving audio packets. This is inefficient for certain calls where only one participant may be talking at a time.

The present invention addresses this and other problems associated with the prior art.

SUMMARY OF THE INVENTION

A push-to-talk conference call is conducted over a packet switched network. Participants send a request and receive approval before being allowed to talk during the conference call. In one implementation, only one of the participants is enabled to transmit audio packets while other participants are only allowed to receive audio packets.

The foregoing and other objects, features and advantages of the invention will become more readily apparent from the following detailed description of a preferred embodiment of the invention which proceeds with reference to the accompanying drawings.

DETAILED DESCRIPTION

Figure 1:
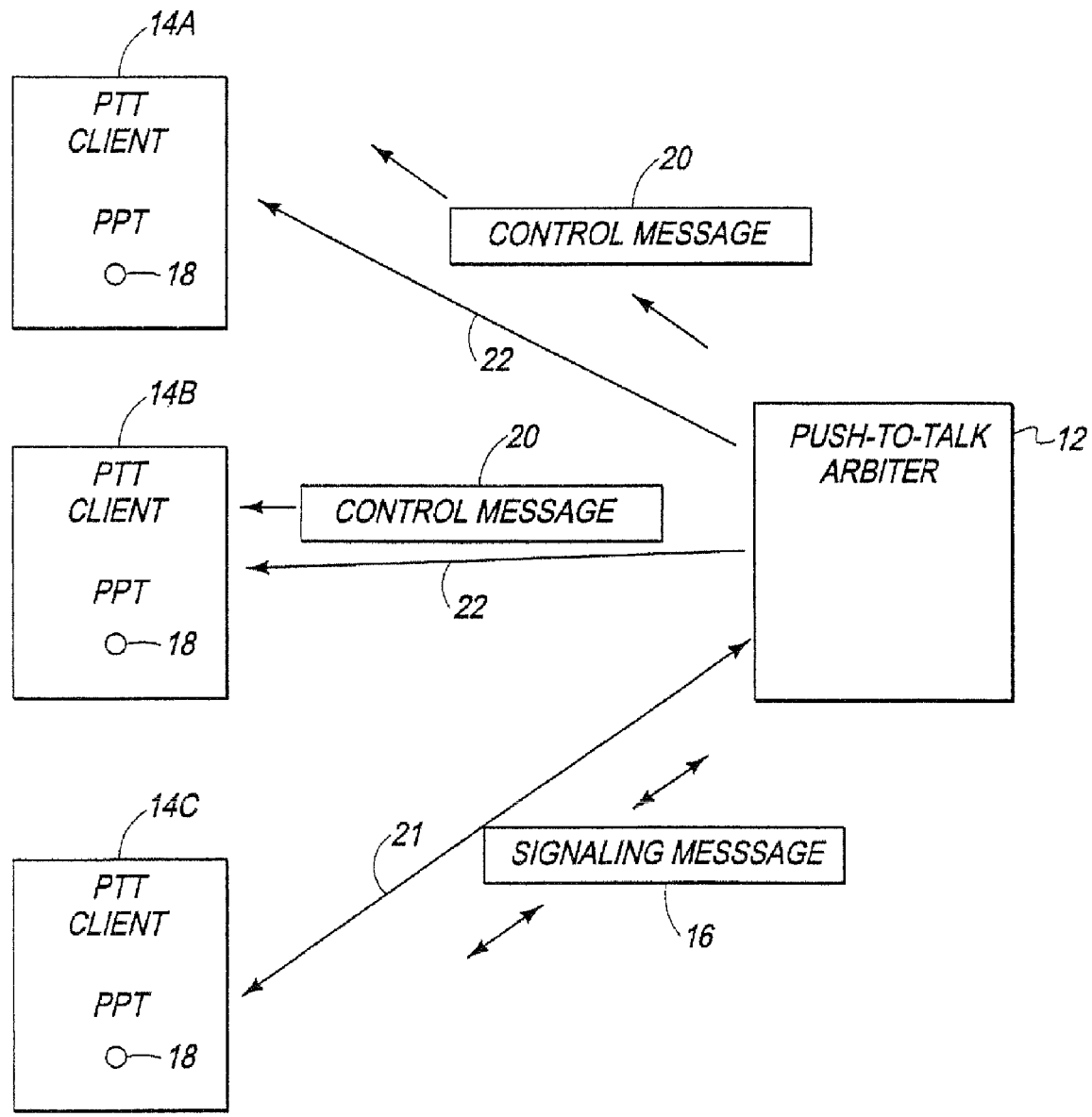
FIG. 1 is a block diagram of a Push-To-Talk (PTT) conference call system.

FIG. 1 shows a Push-To-Talk (PTT) conferencing system that includes an arbiter 12 and clients 14A-14C. The arbiter 12 performs group call setup, session maintenance, floor arbitration and media replication. The arbiter 12 can be any network processing device that receives Voice Over IP (VoIP) packets over the Internet and relays those packets to different clients 14A-14C. In one example, the arbiter 12 may be a network server. The clients 14A-14C can be any device that can convert audio signals into VoIP packets and convert VoIP packets received from the Internet back into audio signals. For example, the clients can be cellular VoIP telephones, Personal Computers (PCs), Personal Digital Devices, VoIP phones, or VoIP gateways which connect to mobile or POTS (Plain Old Telephony System) phones over a circuit switched network. In case of a PTT voice gateway, a PTT-assert, PTT-release and user-interface may be performed using in-band signaling or Interactive Voice Response (IVR).

A PTT conference call is set-up between the PTT clients 14A-14C and the arbiter 12. A half-duplex talk-spurt is alternatively referred to as a PTT session and is initiated by pressing a PTT button, switch, key, etc. 18 on one of the clients 14A-14C. At the start of the PTT session, control plane signaling messages 16 are exchanged between one of the clients 14 and the arbiter 12. In this example, the client 14C initiates the PTT session by exchanging signaling messages 16 with the arbiter 12. In one example, the connection 21 is setup as a half-duplex transmitting call so client 14C can send voice packets to the arbiter 12 (conference call speaker).

During PTT session setup, the arbiter 12 may send control messages 20 to all other clients 14A and 14B designated in the PTT conference call. The control messages 20 sent by arbiter 12 may setup connections 22 with the other PTT clients 14A and 14B in the call group as half-duplex receive-only calls so the clients can only receive voice packets (listen-only). This is done in one example by the arbiter 12 sending control messages 20 that only configure a receive portion of the codecs in clients 14A and 14B.

When one of the PTT clients 14A-14C initiates a PTT session, the signaling message 16 sent to the arbiter 12 may include group conference call information. For example, when the client 14C initiates the PTT session, the signaling message 16 may include the internet addresses for clients 14A and 14B.

Alternately, the signaling message 16 may include a group identifier, which identifies a pre-configured group of users and the internet addresses of the corresponding clients. If a PTT conference call is not already in progress for this group, the arbiter initiates connections to clients identified using the signaling message 16, and then relays audio packets using these connections.

Once the PTT conference call is established, further floor control messages 16 only need to be exchanged when another client 14A or 14B in the conference group wishes to talk. If the PTT button 18 is not pushed, the non-talking clients in the conference call group remain in the listen-only mode and signaling messages 16 may or may not be exchanged. In one implementation, non-talking clients in the listen-only mode are not sent additional signaling messages 16 and are simply forwarded audio packets from the client that is currently talking. In another implementation, the non-talking clients are notified with the signaling messages 16 when the current active talking client releases the PTT button 18

The end of the PTT session is established when the client currently having the floor releases the PTT button 18. For example, when the button 18 is released on client 14C, signaling messages 16 are again exchanged with arbiter 12 releasing the conference call floor. Optionally, control messages 20 might also be exchanged between the arbiter 12 and non-active talking clients 14A and 14B indicating the release of the floor by the client 14C. In another embodiment, floor control messages 20 are not exchanged between the non-active talking clients 14A and 14B and the arbiter 12 when the floor is released. When another PTT session is initiated, the arbiter 12 simply begins forwarding packets from the new talker to the other clients.

This PTT half-duplex conferencing scheme can be implemented using any call control protocol such as Session Initiation Protocol (SIP), International Telecommunication Union (ITU) standard H.323, and Media Gateway Control Protocol (MGCP), just to name a few.

Figure 2:
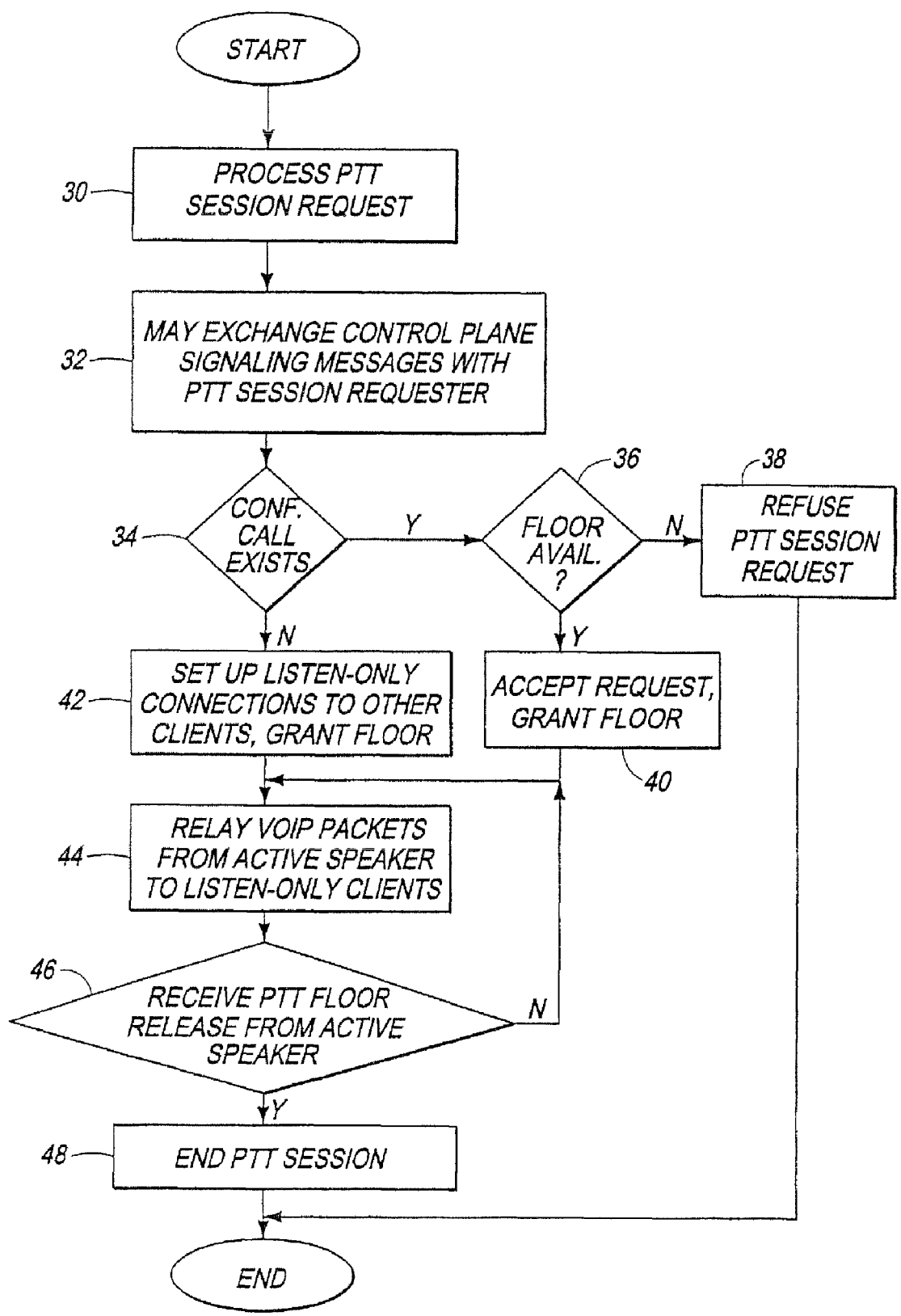
FIG. 2 is a flow diagram showing how an arbiter operates in a PTT conference call.

FIG. 2 describes in further detail how the arbiter operates during the PTT session. The arbiter 12 in one implementation does not use independent floor controls for each client. Alternatively, the arbiter 12 maintains call connections to the individual clients even after a PTT session is terminated. The call connections are maintained until some period of time when no other PTT sessions are initiated. This has a significant advantage since call signaling does not have to be reestablished with the listen-only clients for new PTT sessions. The arbiter simply sends the VoIP packets for new PTT sessions over the already established client connections.

To explain further, the arbiter in block 30 processes a PTT session request. This may be in the form of VoIP signaling that one of the clients 14A-14C sends to the arbiter requesting a VoIP call setup. The PTT session request, if also part of the signaling for initially establishing the PTT conference call, may also include the Internet addresses for the other conference call participants.

The arbiter in block 32 may exchange control plane signaling messages with the PTT session requester. This operation is optional. In some systems the arbiter may not have to send back acknowledgements to the session requester. Instead, the arbiter after receiving a session request in block 30, jumps directly to block 34.

The arbiter in block 34 determines if a conference call already exists. If a conference call does not already exist, the arbiter in block 42 performs whatever VoIP signaling is necessary to establish listen-only VoIP connections with the other clients in the PTT conference. The arbiter then grants the floor to the requester.

If the listen-only connections have been already been established during a previous PTT session request, the arbiter may skip the set-up process in block 42 and not send any additional signaling to the other members of the PTT conference call. This reduces power consumption of clients by preventing the listening clients from having to transmit control messages, such as acknowledge messages to the arbiter for each new PTT session.

The arbiter in block 44 relays VoIP packets from the current active speaker to the listen-only clients for the PTT conference call. If a PTT floor release signal is received from the active speaker in block 46, the arbiter terminates the PTT session in block 48. Otherwise, the arbiter jumps back to block 44 and continues to relay packets from the active speaker to the listen-only clients in the PTT session.

As long as the active speaker does not relinquish the floor for the conference call in block 46, the arbiter continues to relay VoIP packets from the active speaker to the other listen-only clients of the PTT conference call. One way that the active speaker can relinquish the floor is by simply releasing the button 18 (FIG. 1) on the client device. Releasing the button causes the active speaker to send signaling messages to the arbiter terminating the VoIP connection.

All clients of a PTT session group may subscribe to a multicast group. The arbiter 12 can send one set of multicast VoIP packets to the clients of that group. Alternatively, the active speaker client may send multicast VoIP packets to the other members of the multicast group. In this case the arbiter does not have to perform any media handling. Network bandwidth efficiencies are improved by combining the half-duplex communication scheme with the multicasting provided by the arbiter or active speaker client.

A media replicator function in the arbiter 12, replicates and sources the VoIP packets as required to all the listen-only members in the conference call group. In the half-duplex scheme, no mixing is required since only one client in the conference call is allowed to transmit audio packets at any one time. Hence media replication is less complex.

If a conference call already exists in block 34, the arbiter determines if the floor is available in block 36. The floor is available when no other member of the conference call is currently assigned active speaker status (granted the floor). When the PTT session request is part of the initial setup for the PTT conference call, no active speaker currently exists for the conference call. Thus, the client initially requesting establishment of the conference call is typically granted the floor.

If the floor is available in block 36, the arbiter accepts the request and grants the floor to the requester in block 40. The arbiter then starts relaying VoIP packets from the active speaker to the listen-only clients in block 44. If the floor is not available in block 36, the arbiter refuses the PTT session request in block 38. The arbiter may deny the request in block 42, for example, by sending a floor-denied signaling message.

Figure 3A:
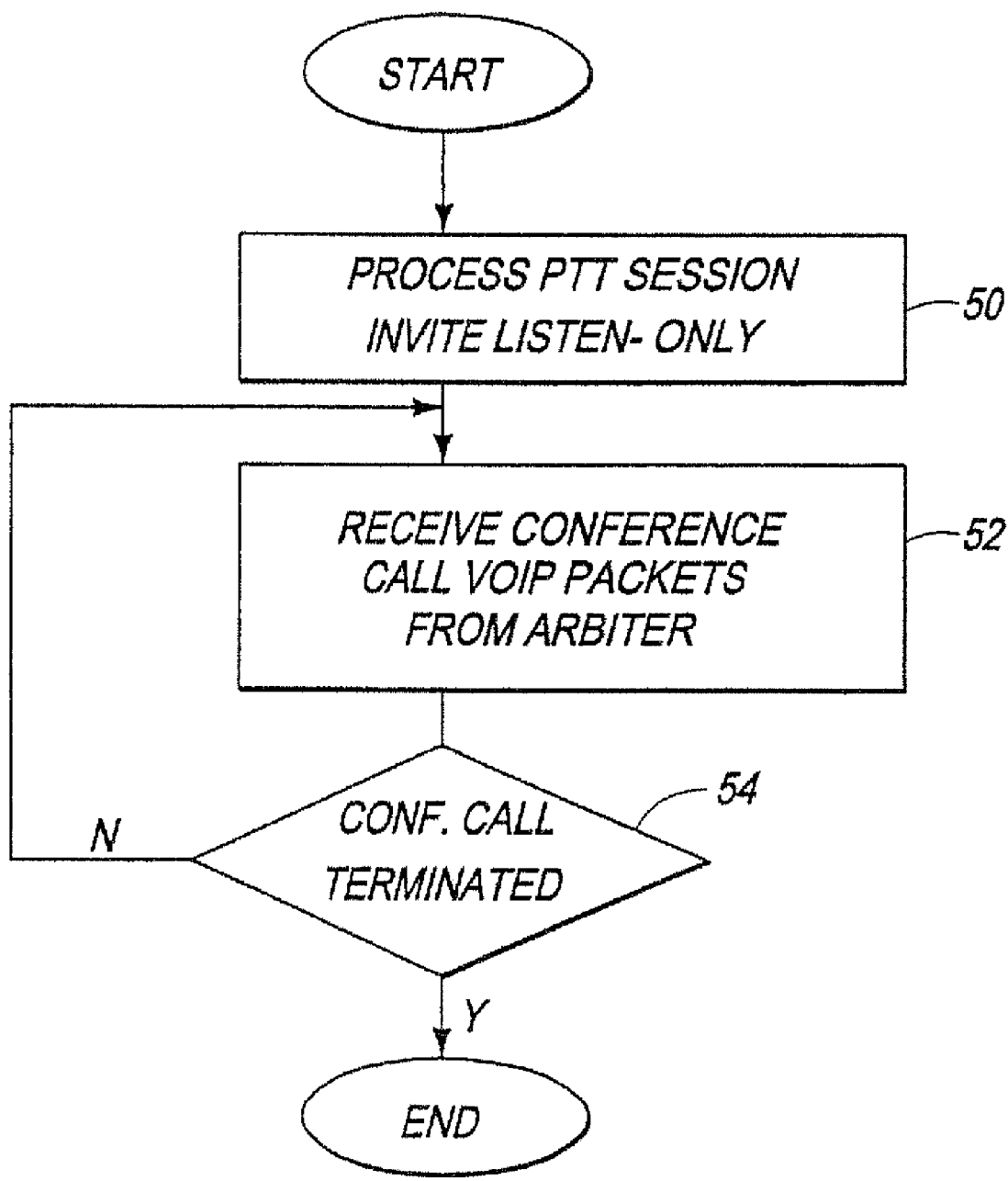
FIG. 3A is a flow diagram showing how a client handles a session invitation for the PTT conference call.

FIG. 3A shows in further detail how a client processes a PTT session invitation from an arbiter. In block 50 the client waits for VoIP signaling from the arbiter inviting the client to join a PTT conference call. The signaling received in block 50 may configure the VoIP connection for listening-only from the arbiter. If the client accepts the invitation, the client in block 52 begins receiving VoIP packets from another client of the PTT conference to group forwarded by the arbiter. The client continues receiving packets until a conference call termination signal is received from the arbiter in block 54.

Figure 3B:
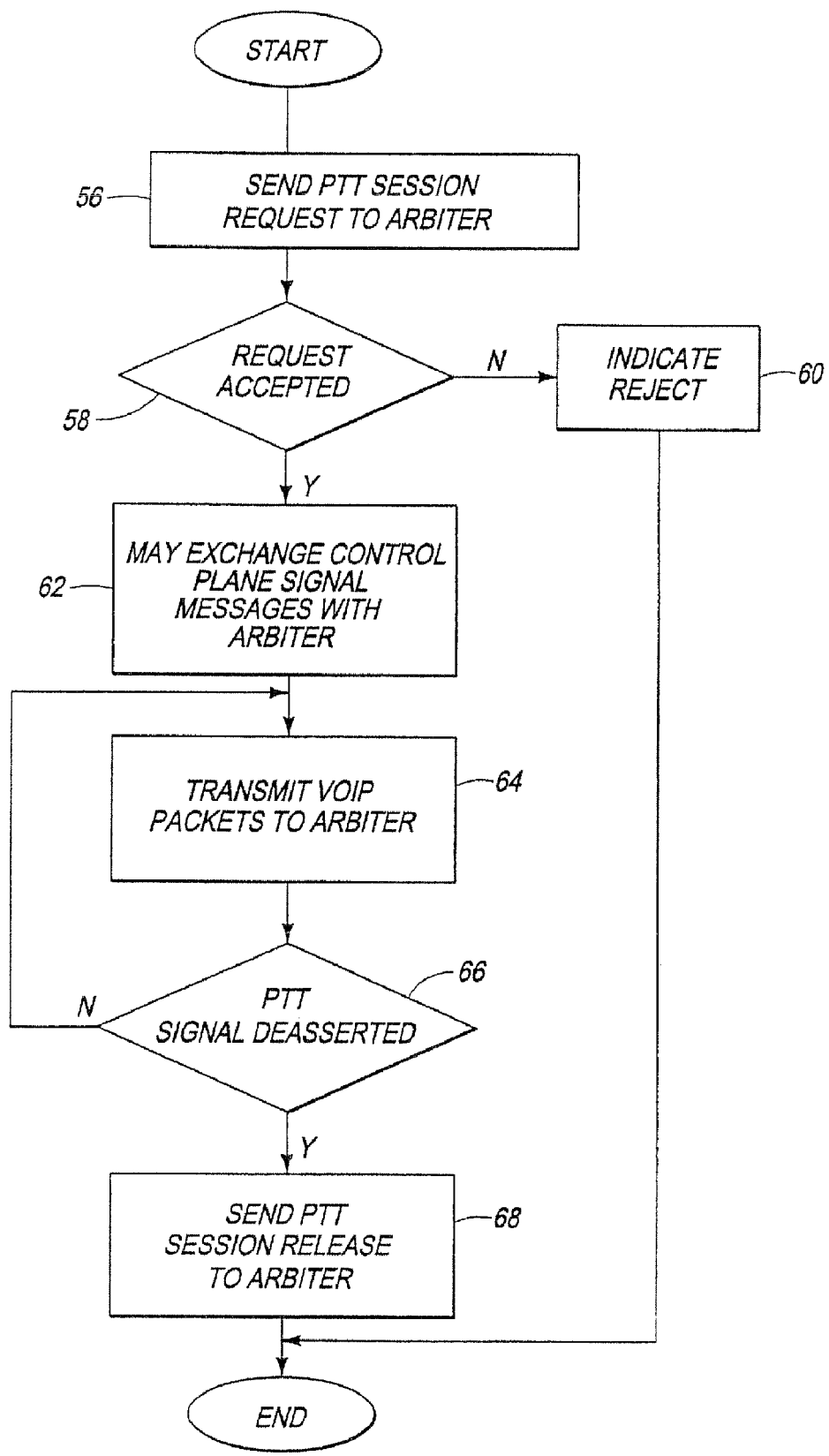
FIG. 3B is a flow diagram showing how a client initiates a PPT conference call.

FIG. 3B shows how one of the clients processes PTT signal assert. A PTT session request is sent to the arbiter in block 56. If the PTT session request is rejected in block 58, the client indicates the rejection typically by generating some sort of tone in block 60. If the arbiter accepts the PTT session request in block 58, the client may exchange control plane signal messages with the arbiter in block 62. Control plane signaling may or may not have to be exchanged with the arbiter.

The client then starts transmitting VoIP packets to the arbiter in block 64. The client transmits VoIP packets until the PTT signal is deserted (PTT button released) in block 66. The client then sends signaling to the arbiter in block 68 releasing the conference call floor.

Figure 4:
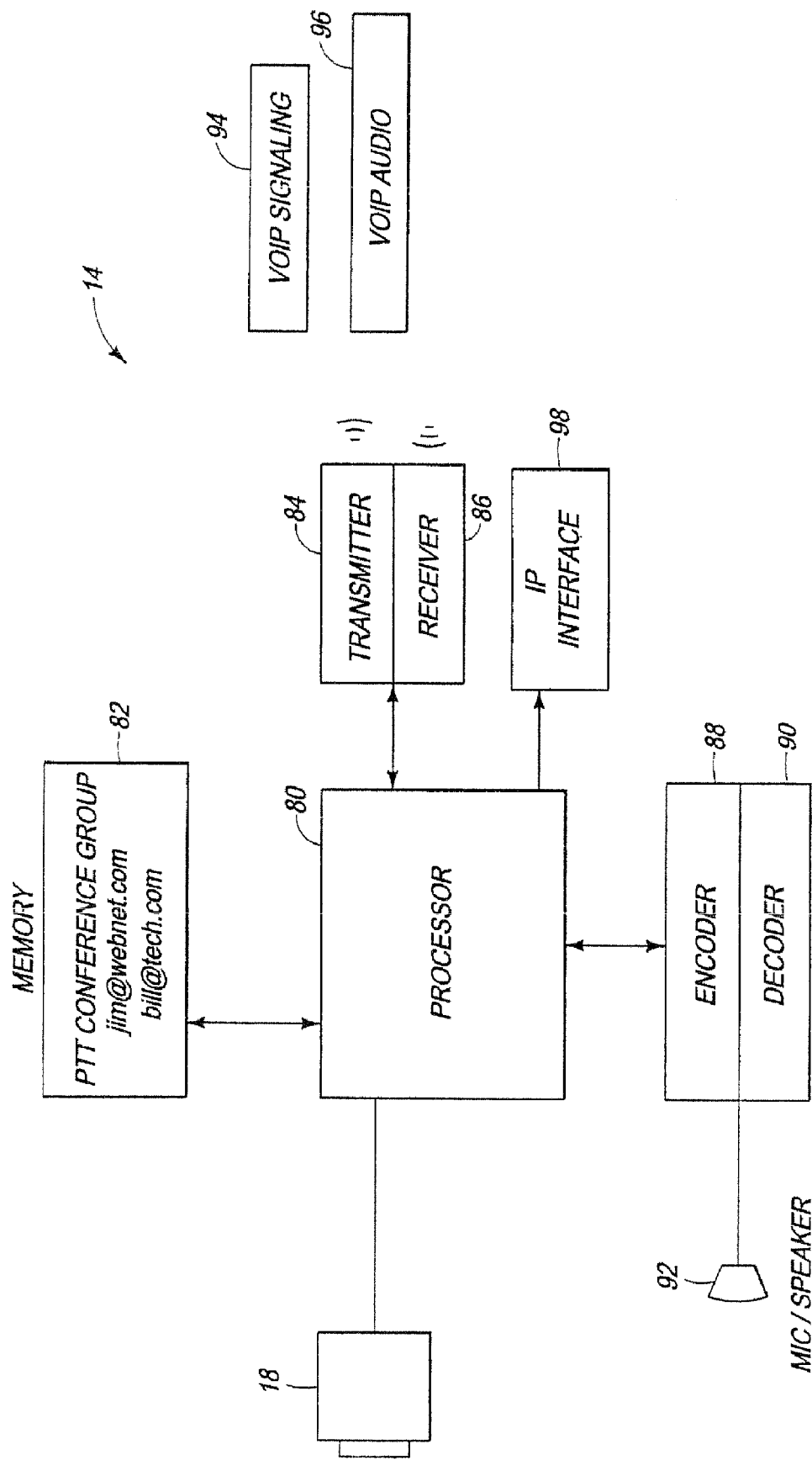
FIG. 4 is a block diagram showing functional elements in one of the conference call clients or in the arbiter.

FIG. 4 shows in more detail some of the functional elements in one of the clients 14 shown in FIG. 1. A memory 82 contains the Internet addresses for all of the clients 14 that are to be members of the PTT conference call. A processor 80 monitors for the PTT signal activated when the PTT button 18 is pressed. It should be understood that button 18 can be any input device that notifies the processor 80 that a user wishes to initiate a PTT session. For example, button 18 may be a button, key, switch, voice activated input, etc. on a cellular VoIP telephone, PC, Personal Digital Device, or VoIP phone.

A microphone and speaker 92 receive and output, respectively, audio signals to a codec 87. The codec 87 includes an encoder 88 and a decoder 90. In one example, the codec 87 is implemented in a Digital Signal Processor (DSP). For a wireless client 14, a transmitter 84 transmits wireless signals that contain VoIP signaling 94 and VoIP audio packets 96. A receiver 86 receives wireless signals that contain the VoIP signaling 94 and VoIP audio packets 96. The client 14 can also include a hardwired IP interface 98 that sends and receives the VoIP signaling 94 and VoIP audio packets 96 over an IP network.

The processor 80 can deactivate components that are not necessary when the client is operating in a receive-only mode. For example, when the client 14 does not currently have the floor, the processor 14 can only receive VoIP packets. In the receive-only mode, the processor 80 can deactivate the transmitter circuitry 84. Depending on the circuitry operating the codec 84, the processor 80 may also disable the encoder 88. If the client 14 is ever granted the floor in the PTT conference call, the processor 80 then reactivates the transmitter 84 and enables encoder 88.

Different priority schemes can be used for determining which clients are granted the floor for the conference call. In one example, the priority is based on timing. The arbiter grants the floor to the client associated with the first received PTT session request. For example, as soon as the floor is released by one of the clients, the arbiter grants the floor to the client associated with the next received PTT session request. In another example, priority values are contained in the PTT session requests. In Page: 8 another example, the user priority is pre-configured in a user profile database used by the arbiter.

The arbiter can then grant the floor to the clients according to their associated priority values. For example, the initial PTT session request may contain priority values for all of the clients in the conference call group. Several clients may send PTT session requests at about the same time, either before or after the floor is released. After the floor is released, the arbiter grants speaking rights to the requesting client having the highest priority value. Alternatively, the arbiter may keep track of how many times PTT session requests have been denied to particular clients. The arbiter could then assign the PTT session to the requesting client with the highest number of PTT session request denials.

In yet another example, some client may have super priority status. In this situation, the super priority client is given the floor even when it has not been released by another client. The super priority client simply pushes the PTT button. If the PTT session request is for a super priority client, the arbiter sends signaling to the current speaker in the conference call terminating the PTT session. The arbiter then grants the floor to the super priority client.

It should also be understood that the PTT conference call can be conducted between any number of clients. For example, the PTT conference call may only be between two clients. Another PTT conference call may involve dozens or hundreds of different clients. The PTT system could also be used for instant messaging applications.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A conference call system, comprising:
an arbiter and a plurality of push-to-talk clients;
wherein the arbiter configured:
to receive push-to-talk signals from a particular client, said signals including the internet addresses of a selected group of clients that constitute a particular conference call group; to initiate a push-to-talk conference call between said selected group of clients by using push-to-talk signaling over a Voice over IP packet switched network; to enable said particular client to transmit Voice Over IP packets to members of said particular conference call group while enabling the other clients in said particular conference call group to only receive Voice Over IP packets;
to receive a push-to-talk session request from one of the clients; and to establish a transmit VoIP connection for the client sending the push-to-talk session request in response to the push-to-talk session request while maintaining currently existing receive-only VoIP connections for the other clients and terminating a transmit VoIP connection for one of the clients that had a floor in the push-to-talk conference call prior to the push-to-talk session request.

2. A conference call system according to claim 1 wherein the arbiter receives VoIP packets from an active speaker client and forwards the packets to other clients in the conference call group.

3. A conference call system according to claim 1 where an active speaker client sends packets to other clients in the conference call group.

4. A conference call system according to claim 1 wherein the arbiter forwards the VoIP packets to the clients in the conference call group using multicast addressing.

5. A conference call system according to claim 1 wherein the receive only connection to members of a conference call group is maintained for a period after a conference call ends in order to facilitate setup of a subsequent conference call.

6. A conference call system according to claim 1 wherein the arbiter sends receive-only codec signaling to clients that are only enabled to receive audio packets in the conference call.

7. A conference call system according to claim 1 wherein the arbiter refuses speaking requests from clients while another client has speaking privileges in the conference call.

8. A conference call system according to claim 1 wherein the arbiter is configured to receive the internet addresses for the clients in the conference call group in the push to talk signaling from the particular client.

9. A conference call system according to claim 1 wherein the arbiter receives a group identifier in the push-to-talk signaling, the group identifier used for locating internet addresses for the clients in the conference call group.

10. A conference call system according to claim 1 wherein the arbiter sends signaling messages to the clients in the conference call group indicating when an active speaker in the conference call group has given up speaking privileges.

11. A conference call system according to claim 1 wherein a client of the selected group of clients is configured to deactivate a transmitter within the client when the client is enabled to only receive Voice Over IP packets.

12. A conference call system according to claim 11 wherein the client of the selected group of clients is configured to reactivate the transmitter within the client when the client is granted a floor in the push-to-talk conference call.

13. A conference call system according to claim 1 wherein a client of the selected group of clients is configured to disable an encoder within the client when the client is enabled to only receive Voice Over IP packets, the encoder within the client for encoding.

14. A conference call system according to claim 13 wherein the client of the selected group of clients is configured to enable the encoder within the client when the client is granted a floor in the push-to-talk conference call.

15. A conference call system according to claim 1 wherein the arbiter is configured to accept a push-to-talk session request from a client of the selected group of clients even if a floor in the push-to-talk conference call has not been released by another client of the selected group of clients.

16. A method for conducting a conference call, comprising:
    establishing a push-to-talk conference call with a selected group of clients over a packet switched network where a client in said selected group of clients can send a push-to-talk request and receive approval before being allowed to send audio packets during the conference call to said selected group of clients, wherein the establishing comprises receiving internet addresses of the selected group of clients;
    establishing a transmit only audio packet connection with a first one of the participants;
    establishing receive-only audio packet connections with the other participants for receiving audio packets generated by the first one of the participants;
    maintaining said receive-only audio packet connections for a period of time after a conference call ends to facilitate establishing a different conference call;
    receiving a push-to-talk session request from a second one of the participants;
    responsive to receiving the push-to-talk session request, terminating the transmit only audio packet connection with the first one of the participants and establishing another transmit audio packet connection with the second one of the participants; and
    using the established receive-only audio packet connections for the other participants to forward audio packets transmitted from the second one of the participants.

17. A method according to claim 16 including allowing only by one of the participants currently having speaking authority to transmit the audio packets for the conference call.

18. A method according to claim 16 including relaying the audio packets through an arbiter to other members of the conference call.

19. A method according to claim 16 including sending a push-to-talk session request over the packet switched network according to activation of a push-to-talk device on a client.

20. A method according to claim 16 including granting talking authority for the conference call to participants sending a request when no other participants of the conference call currently have talking authority.

21. A system for conducting a conference call between a selected group of clients, comprising:
    means for establishing a push-to-talk conference call between said selected group of clients over a packet switched network, where participants send a request and receive approval before being allowed to send audio packets to said selected group of clients during the conference call;
    means for receiving internet addresses of the selected group of clients;
    means for establishing a transmit audio packet connection with a first one of the participants;
    means for establishing receive-only audio packet connections with the other participants for receiving audio packets generated by said first one of the participants;
    means for receiving a push-to-talk session request from a second one of the participants;
    means for terminating the transmit audio packet connection with the first one of the participants and establishing another transmit audio packet connection with the second one of the participants responsive to the push-to-talk session request; and
    means for using the established receive-only audio packet connections for the other participants to forward audio packets transmitted from the second one of the participants.

22. A system according to claim 21 including means for allowing only by one of the participants currently having speaking authority to transmit the audio packets for the conference call.

23. A system according to claim 21 including means for relaying the audio packets through an arbiter to other members of the conference call.

24. A system according to claim 21 including means for sending a push-to-talk session request over the packet switched network according to activation of a push-to-talk device on a client.

25. A system according to claim 21 including means for granting talking authority for the conference call to participants sending a request when no other participants of the conference call currently have talking authority.

* * * * *